(12) United States Patent
Neve et al.

(10) Patent No.: US 6,533,186 B2
(45) Date of Patent: Mar. 18, 2003

(54) METHOD FOR CONTROLLING A FLOOR HEATING SYSTEM

(75) Inventors: Christian Neve, Lausen (CH); Jørgen Seerup, Mårslet (DK); Eva Kühne, Silkeborg (DK)

(73) Assignee: Danfoss A/S, Nordborg (DK)

( * ) Notice: Subject to any disclaimer, the term of this patent is extended or adjusted under 35 U.S.C. 154(b) by 90 days.

(21) Appl. No.: 09/988,072

(22) Filed: Nov. 16, 2001

(65) Prior Publication Data

US 2002/0088867 A1 Jul. 11, 2002

(30) Foreign Application Priority Data

Nov. 18, 2000 (DE) .......................... 100 57 359

(51) Int. Cl.[7] ................................. F24D 5/10
(52) U.S. Cl. ................. 237/69; 236/46 F; 165/56
(58) Field of Search ................ 237/69, 8 R, 8 A; 236/46 F; 165/56, 267, 268, 269

(56) References Cited

U.S. PATENT DOCUMENTS

| | | | | |
|---|---|---|---|---|
| 3,568,924 A | * | 3/1971 | Chenault | 237/1 R |
| 4,011,989 A | * | 3/1977 | Diggs | 165/56 |
| 4,396,148 A | * | 8/1983 | Masson | 236/46 R |
| 4,410,131 A | * | 10/1983 | Radtke et al. | 165/237 |
| 4,508,162 A | * | 4/1985 | Radtke | 165/56 |
| 4,674,027 A | * | 6/1987 | Beckey | 165/238 |
| 5,240,179 A | * | 8/1993 | Drinkwater | 137/59 |
| 5,579,996 A | * | 12/1996 | Fiedrich | 165/45 |
| 5,588,589 A | * | 12/1996 | Ishihara et al. | 165/267 |
| 5,782,296 A | * | 7/1998 | Mehta | 165/268 |

FOREIGN PATENT DOCUMENTS

| | | | | |
|---|---|---|---|---|
| DE | 37 08 449 A1 | | 9/1988 | |
| JP | 58026937 A | * | 2/1983 | F24D/13/02 |
| JP | 407019503 A | * | 1/1995 | F24D/3/00 |
| JP | 09273762 A | * | 10/1997 | F24D/3/00 |

* cited by examiner

Primary Examiner—Derek Boles
(74) Attorney, Agent, or Firm—Burns, Doane, Swecker & Mathis, L.L.P.

(57) ABSTRACT

A method for controlling a floor heating system, in which a heating circuit in a room is supplied with a heat carrying fluid within a cycle for a supply period, with the supply period being chosen in dependence of the room temperature. To operate the floor heating more favorably with regard to the energy consumption, at least one additional parameter is registered next to the room temperature. The cycle duration and the duration of the supply period are chosen in dependence of the room temperature and the parameter.

8 Claims, 1 Drawing Sheet

METHOD FOR CONTROLLING A FLOOR HEATING SYSTEM

FIELD OF THE INVENTION

Figure 1:
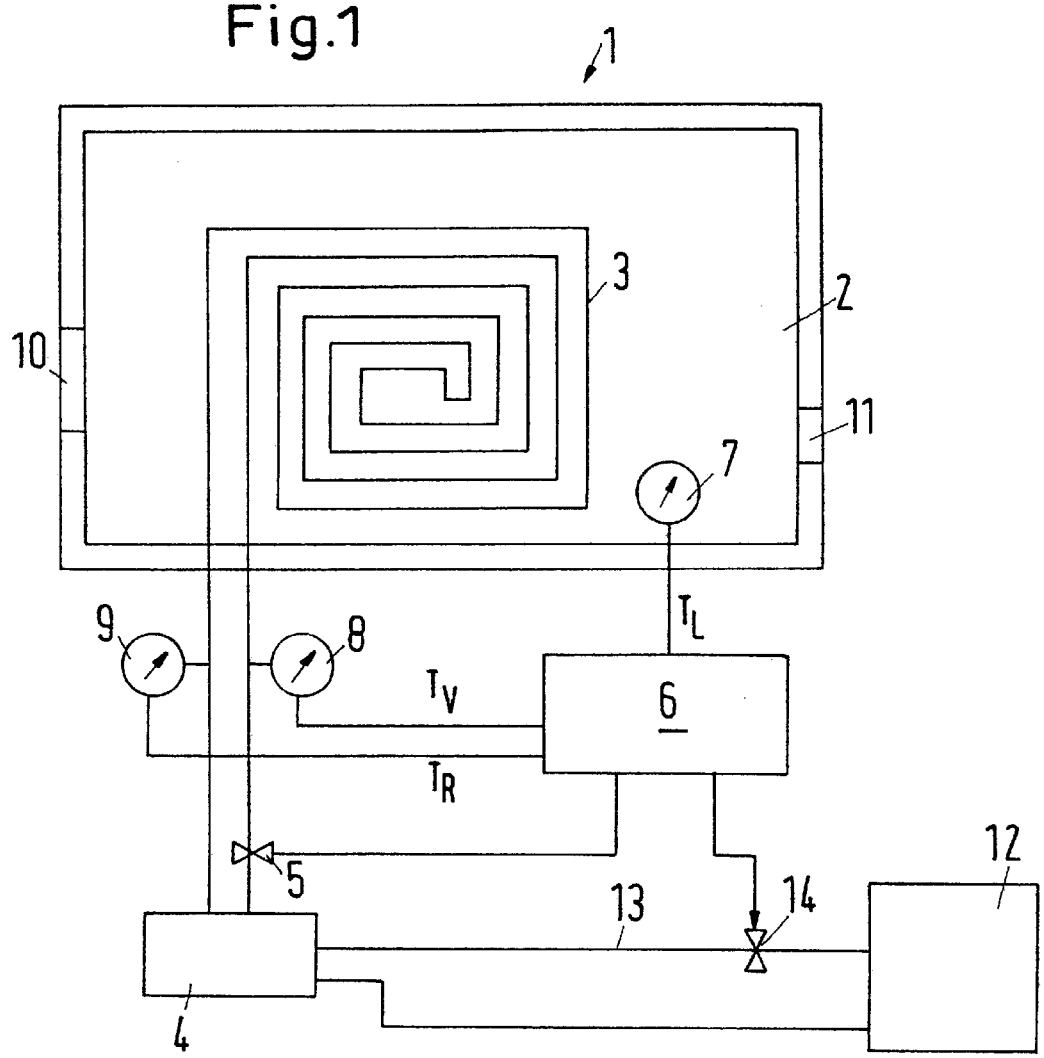

The invention concerns a method for controlling a floor heating system, in which, within a cycle, a heating circuit in a room is supplied with a heat carrying fluid for a supply period, the supply period being chosen in dependence of the room temperature.

BACKGROUND OF THE INVENTION

A method of this kind is known from DE 37 08 449. In the known case, it is endeavoured to avoid an irregular temperature distribution on the floor surface, which could occur in connection with a throttling. The throttling could namely cause the heat carrying fluid to be cooled before leaving the heating circuit. Therefore, the heat carrying fluid is not throttled, but the cycles are controlled, during which the heat carrying fluid can flow through the heating circuit. The cycle durations are specified by the system manufacturer. They are in the range from 26 to 36 minutes. Within each cycle, the user or a room temperature controller can state an OFF-period, which can be in the range from 0 to 24 minutes. The shorter the duration of the OFF-period, the more intensively the room is heated.

SUMMARY OF THE INVENTION

This control method is not optimal with regard to the energy consumption.

The invention is based on the task of providing a more favourable operation of a floor heating system with regard to the energy consumption.

With a method as mentioned in the introduction, this task is solved in that next to the room temperature at least one additional parameter is registered, the cycle duration and the duration of the supply period being chosen in dependence of the room temperature and the parameter.

With this method, firstly the number of influence sizes is increased, which are considered in connection with the control. Secondly, however, also the number of intervention opportunities is increased, that is, not only one size, but two sizes, is controlled. Here, various opportunities exist. The cycle duration on a whole can be changed and at the same time, during the cycle, also the supply period can be changed. However, the supply period can also be regarded as ON-time and the remaining period of a cycle as OFF-time, ON-time and OFF-time, respectively, being changed. The relation between these two times is determined in dependence of the load on the heated room. Thus, it is no longer required that fixed cycle durations are observed, which is particularly disadvantageous, when changes occur during a cycle duration, which have a substantial influence on the room temperature. This control method is particularly advantageous when it is desired to keep a room temperature constant.

It is preferred that a thermal time constant for the room is chosen as a parameter. The time constant is a measure for how fast the room is heated when supplied with a certain heat amount. The heat amount supplied is known, or can be calculated from the difference between the supply temperature and the return temperature as well as the supply quantity. By means of the time constant, the ON-time and the OFF-time can now be calculated in such a way that a desired temperature is maintained. During the heating phase of the room or the cooling, respectively, the time constant will be less considered during a large share of this phase, and, for example, perform the heating with the highest possible output.

Preferably, different time constants are used for heating and cooling. Thus, it is possible to keep the room temperature even closer to the desired value.

Preferably, the time constant is determined on the basis of measurings of the room temperature at different Preferably, these times are in a heating phase or a cooling phase, respectively. When, however, the room is maintained at the desired temperature, it is more difficult to determine the time constant. In a manner of speaking, the method is adaptive. When the room temperatures are measured at different times, the time constants can be determined. Above all, this method is advantageous in that the time constant can be corrected continuously or from time to time, to consider changes, which have occurred in the room itself or in its neighbourhood.

Preferably, the system is switched to comfort operation, when for a certain period no heating requirement has existed, the heating circuit being supplied with heat carrying fluid during comfort operation in such a way that the room is not heated. In many cases, typically periods exist, in which heat is not required from the floor heating system. Such a situation may occur, when the room is heated by solar irradiation. Even though the room temperature then corresponds to the temperature pre-selected by the user, the feeling of comfort may be influenced by the fact that the floor is cooled down. This particularly concerns floors, which are tiled or clinkered. When the user has to walk around on such "stone floors" with bare feet or with socks or thin soles, this will give him an uncomfortable feeling. When, however, the system is switched to comfort operation, it is ensured that merely the floor is heated, the room temperature, however, not being influenced, or at least not significantly. This causes that the user does not find the floor cold. As, however, the room is not heated, the conditions are at least substantially optimal with regard to the energy consumption.

Preferably, a floor temperature is calculated on the basis of several other temperatures, and the cycle duration and the duration of the supply period are synchronised with the floor temperature. It is thus established, which temperature the floor must have to ensure that the room is not further heated. For this purpose, other temperatures can be used, which are available. Now, this floor temperature can be specified as a value and the cycle duration and the duration of the supply or the ON-time and the OFF-time can be synchronised with each other in such a way that the desired temperature occurs. Of course, this can also be achieved by means of a control, during which the floor temperature is measured.

It is particularly preferred that the floor temperature is calculated according to the following formula:

$$T_F = T_L - \frac{C_W}{C_L}(T_V - T_R)$$

$T_F$ being the floor temperature,
$T_L$ being the air temperature,
$T_V$ being the supply temperature,
$T_R$ being the return temperature,
$C_W$ being the density of water and
$C_L$ being the density of air.

With this embodiment, a heat balance occurs. This confirms that $$(T_V - T_R) \cdot C_W = (T_L - T_F) \cdot C_L.$$

$T_V$, $T_R$ und $T_L$ are measured. As $C_W$ and $C_L$ are constants, $T_F$ can be calculated. Then, the ON-times and the OFF-times, respectively, are kept so that $T_F$ does not exceed the calculated value. In stead, also the relation between the room temperature $T_L$ and the supply temperature $T_V$ can be taken into consideration.

Preferably, during comfort operation, the supply is turned off to all other rooms being connected with the same heat source. The heat source is considered to be a place in the heating system, which supplies a heat carrying fluid with a substantially constant temperature independently of the load. During comfort operation, the heat carrying medium thus has the optimum supply temperature, that is, temperature reductions caused by the consumption in other rooms do not occur.

BRIEF DESCRIPTION OF THE DRAWING FIGURES

In the following, the invention is explained on the basis of an embodiment example in connection with the drawings, showing:

FIG. 1 a schematic view of a heating system

Figure 2:
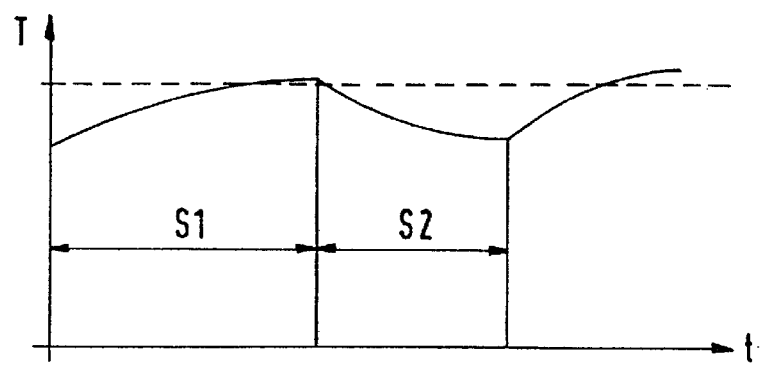

FIG. 2 a schematic view of a temperature course

DETAILED DESCRIPTION OF THE INVENTION

A heating system 1 for a room 2 has a heating circuit 3, which is supplied with a heat carrying fluid, for example hot water, from a heat source 4, for example a boiler with supply temperature control. The flow of the heat carrying fluid to the heating circuit 3 is controlled by a valve 5, which is activated by a control device 6. Via a room thermometer 7, the control device receives information about the air temperature $T_L$. Further, the control device 6 is connected with a thermometer 8, which measures the supply temperature $T_V$ and a thermometer 9, which measures the return temperature $T_R$.

The room 2 has a window 10 and a door 11. The temperature in the room can also, for example, be influenced by solar irradiation through the window or heat escaping through the open door 11.

The control device opens the valve 5 or closes it. In FIG. 2, the temperature T is shown upwards, and the time t is shown to the right. In a period S1, the heating circuit 3 is supplied with heat carrying fluid. In a period S2, the supply is interrupted. Accordingly, the period S1 is also called "ON-time" and the period S2 is called "OFF-time". The sum of S1+S2 is defined as cycle.

As influence size for the selection of the ON-time S1 and the OFF-time S2, is used firstly the room temperature $T_L$, secondly, however, also a second parameter, which is explained in the following. The second parameter can, for example, be the thermal time constant of the room 2. During heating, the control device 6 measures the temperature T at different times. This measuring is at least required for the first putting into operation of the heating system. However, it can also be repeated during normal operation to adapt the time constant to changes, which may have occurred in the meantime. In a similar way, a time constant can also be determined during cooling. In many cases, the time constants during heating and those during cooling differ from each other.

When it is desired to observe a predetermined temperature, which is, for example, specified by a reference value transmitter, the knowledge of the time constants plays a certain role. The ON-time S1 and the OFF-time S2 are set and adapted to each other in such a way that the temperature can be maintained with the lowest possible heat losses.

This is particularly interesting in cases, in which a heat requirement does not really exist. Such situations occur, for example, when free heat is available, for example because of an intensive solar irradiation. In this case, the ON-time S1 can theoretically be reduced to zero. In this case, however, the floor would cool down heavily, which the user would find uncomfortable. Therefore, a minimum ON-time S1 is used, which ensures a certain temperature of the floor $T_F$, the temperature $T_F$ being chosen so that a heating of the room 2 does not occur. In this connection, the heat balance of the room is taken into consideration, meaning that $$(T_V - T_R) \cdot C_W = (T_L - T_F) \cdot C_L.$$

Here, $T_V$ is the air temperature, $T_R$ is the return temperature, $T_F$ is the floor temperature, $T_L$ is the air temperature (=room temperature), $C_W$ is the density of water and $C_L$ is the density of air. $T_V$, $T_R$ and $T_L$ are measured. $C_W$ and $C_L$ are constants. Accordingly, $T_F$ can be calculated. Subsequently, S1 and S2 are set so that $T_F$ does not exceed the calculated value. Here, the ON-time S1 is in the dimension of 10% to 30%, preferably 15% to 25% of a period S1+S2.

Of course, also the relation between the room temperature and the supply temperature can be used for calculating the floor temperatures A comfort operation of this kin will, for example, be controlled, when for a predetermined period, for example one hour, a heat requirement has not existed in the room 2.

A further room 12 is shown schematically, which is connected via a supply line 13 with the heat source 4, a valve 14 being arranged in the supply line 13, the valve 14 also being activated by the control device 6. When the heating circuit 3 is switched to comfort operation, the control device 6 closes the valve 14.

Now, the floor temperature $T_F$ can be measured, which requires a temperature sensor (not shown in detail). Or, the floor temperature can be controlled via the supply temperature and the relation between S1 and S2 in such a way that the floor temperature $T_F$ is reached.

What is claimed is:

1. Method for controlling a floor heating system, comprising supplying, within a cycle, a heat carrying fluid to a heating circuit in a room for a supply period chosen in dependence of a temperature in the room, determining next to the room temperature at least one additional parameter, and choosing a duration of the cycle and a duration of the supply period in dependence of the room temperature and the parameter.

2. Method according to claim 1, wherein a thermal time constant for the room is chosen as the parameter.

3. Method according to claim 2, wherein different thermal time constants are chosen for heating and cooling.

4. Method according to claim 2, wherein the thermal time constant is determined on the basis of measurements of the room temperature at different times.

5. Method for controlling a floor heating system, comprising supplying, within a cycle, a heat carrying fluid to a heating circuit in a room for a supply period chosen in dependence of a temperature in the room, determining next to the room temperature at least one additional parameter, and choosing a duration of the cycle and a duration of the supply period in dependence of the room temperature and the parameter, the system being switched to a comfort operation when for a certain period no heating requirement has existed, the heating circuit being supplied with the heat carrying fluid during the comfort operation in such a way that no heat is supplied to the room.

6. Method according to claim 5, including calculating a floor temperature on the basis of several other temperatures, and synchronizing the duration of the cycle and the duration of the supply period with the floor temperature.

7. Method according to claim 6, wherein the floor temperature is calculated according to the following formula:

$$T_F = T_L - \frac{C_W}{C_L}(T_V - T_R)$$

$T_F$ being the floor temperature, $T_L$ being the air temperature, $T_V$ being the supply temperature, $T_R$ being the return temperature, $C_W$ being the density of water and $C_L$ being the density of air.

8. Method according to claim 5, wherein heat carrying fluid is supplied to a plurality of rooms from a single heat source, and during the comfort operation for one of the rooms, the supply of heat carrying fluid is turned off to all other rooms connected with the single heat source.

* * * * *